H. Laurence,
Making Teeth.
N° 6,406.    Patented May 1, 1849.
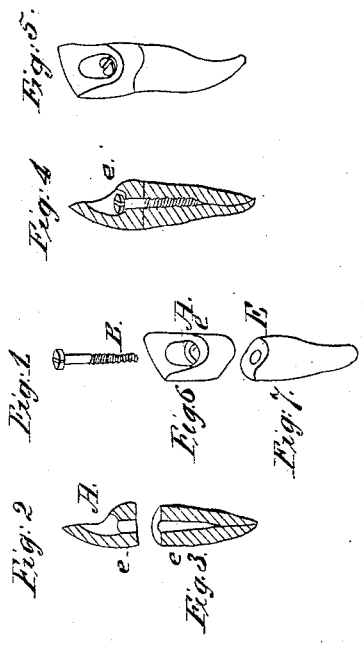
Witnesses:
M. Hannum
A. Wright
Inventor:
Henry Laurence

UNITED STATES PATENT OFFICE.

HENRY LAWRENCE, OF PHILADELPHIA, PENNSYLVANIA.

ARTIFICIAL TEETH.

Specification of Letters Patent No. 6,406, dated May 1, 1849.

*To all whom it may concern:*

Be it known that I, HENRY LAWRENCE, of Philadelphia, in the State of Pennsylvania, have invented a new and useful Improvement in the Construction of Artificial Pivot-Teeth and in the Mode of Attaching the Same to the Natural Fang or Root in the Mouth; and I do hereby declare that the following is a full, clear, and exact description of the construction and operation of the same, reference being had to the annexed drawings, making a part of this specification, in which—

Figure 1 is a headed screw which I use as a means of attaching the pivot-tooth to the fang, or root. Fig. 2 is a vertical section of the pivot-tooth. Fig. 3, is a longitudinal section of a root prepared for the screw. Fig. 4, is a longitudinal section of the tooth and fang connected together by the screw. Fig. 5, is a perspective view of the tooth and fang when united.

The screw, Fig. 1, I make of gold, or any suitable metal, and of a size sufficient to hold firmly the pivot-tooth through which it passes, to the root.

The pivot-tooth, Fig. 6, is constructed of any suitable material used for the manufacture of artificial teeth. It is made of the same size and shape as the ordinary pivot-tooth, but with the opening, of which *e* is a section, in Fig. 2, for the pivot, extending from the base, through the body of the tooth, and terminating on the posterior, or lingual side of the cutting edge, with a countersink, or suitable bearing to receive the head of the screw.

The manner of fixing the tooth to the root is as follows: The screw, Fig. 1, is passed through the opening, *e* of Fig. 6, in such manner as that the head will be received and supported in the countersink A, while the worm of the screw B, Fig. 1, is made to enter the natural opening, F, of the root, Fig. 7, suitably enlarged for that purpose, into which it is turned by a small screw-driver, without rotating the tooth, the base of which is drawn to that of the fang, or root, and is thus firmly fastened to it.

What I claim as my invention, and desire to secure by Letters Patent, is—

Making or preparing the tooth with an aperture passing through it and terminating with a countersink or suitable bearing to receive or support the head of the screw, as herein set forth, as a new article of manufacture.

HENRY LAWRENCE.

In the presence of—
    M. HANNUM,
    R. E. WRIGHT.